(No Model.)
T. ROSE.
METHOD OF WORKING VOLATILE HYDRATES FOR ARTIFICIAL REFRIGERATION.
No. 244,935. Patented July 26, 1881.
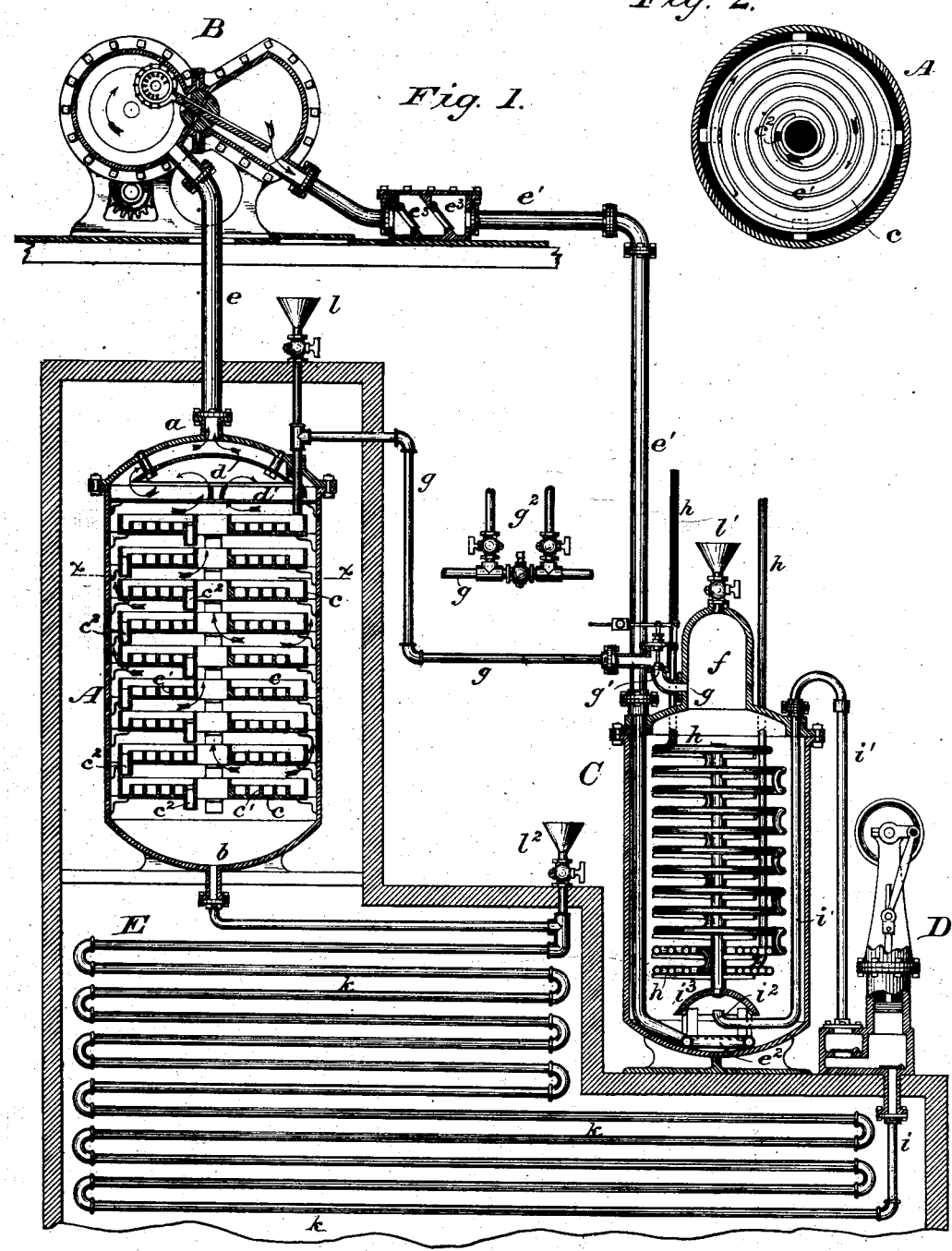
WITNESSES
INVENTOR
Thomas Rose.
By his Attorney

UNITED STATES PATENT OFFICE.

THOMAS ROSE, OF SAN ANTONIO, TEXAS, ASSIGNOR TO ROYAL CHAPIN, OF SAME PLACE.

METHOD OF WORKING VOLATILE HYDRATES FOR ARTIFICIAL REFRIGERATION.

SPECIFICATION forming part of Letters Patent No. 244,935, dated July 26, 1881.

Application filed January 14, 1881. (No model.)

*To all whom it may concern:*

Be it known that I, THOMAS ROSE, of San Antonio, in the county of Bexar and State of Texas, have invented a certain new and useful Method of Working Volatile Hydrates for Artificial Refrigeration and Apparatus Employed Therein; and I do hereby declare that the following specification, taken in connection with the drawings furnished and forming a part of the same, is a clear, true, and complete description of my invention.

In the practice of my novel method of working volatile hydrates in artificial refrigeration I prefer to employ hydrate of ammonia, although volatile matters other than ammonia may be employed when capable of being worked in an aqueous solution.

The novelty of my method consists in circulating through the chamber or apartment wherein refrigeration is desired the ammoniacal solution under a low temperature previously induced by the expansive elimination of more or less of the volatile matter contained in the solution. Heretofore such solutions have been employed in retorts, from which the volatile matter is, by the application of heat in a furnace, first expelled in gaseous form, then condensed, then circulated through the refrigerating-chamber, it meanwhile resuming its gaseous condition during its passage; or, instead of circulating the condensed volatile matter within the refrigerating-chamber, it has heretofore been so circulated as to reduce to a low temperature a specially provided non-congealable liquid, and this latter has then been circulated through the refrigerating-chamber. So far as I know, I am the first to rely upon the aqueous ammoniacal solution itself as a circulating agent for taking up and conveying heat from a refrigerating-chamber, thus obviating the heating of retorts, as well as the use of separate non-congealable liquids, and rendering the appliances used therein less complicated and expensive than those heretofore employed in the working of aqueous ammoniacal solutions in artificial refrigeration.

It is not to be understood that I claim to be the first to propose or to use as a circulating refrigerating agent a liquid wholly or partially-volatile which has been previously cooled by the elimination therefrom of a portion of the volatile matter, for I am well aware that ether, and anhydrous compounds containing ether, sulphuric acid, or ammonia, and also a compound of ammonia and glycerine, have heretofore been used in the manner indicated.

The solutions to which the main feature of my invention is limited are aqueous, and of all the known volatile matters I employ only such as can be profitably and successfully worked as hydrates. So far as relates to my apparatus, however, I am of course aware that it can be employed with good results with many of the numerous volatile or partially-volatile refrigerating agents or compounds, although I prefer to use therewith volatile hydrates, as herein specially indicated.

The apparatus devised by me involves an expansion-chamber, in which the volatile matter is partially eliminated from the solution for the express purpose of reducing the temperature of the solution, and this elimination of vapor, instead of being effected by the application of furnace-heat, is due solely to the inevitable release of the volatile matter incident to a partial vacuum in the expansion-chamber, together with an extensive area of exposure of the solution within the chamber; also, a chamber wherein is effected the condensing of the ammonia-gas taken from the expansion-chamber, and its reabsorbtion by the low solution after its service as a circulating refrigerant, and to aid in this operation currents of water at available temperature are circulated in pipes within this condensing and absorbing chamber; also, a refrigerating chamber or apartment traversed by pipes, within which the solution is circulated on its way from the expansion-chamber to the absorbing-chamber. For mechanical agents a pump is employed for transferring the ammonia-gas from the expansion-chamber to the absorbing-chamber, and a second pump for maintaining a circulation of the solution from the expansion-chamber through the refrigerator and absorber and forcing it thence to the expansion-chamber, and so on continuously, both pumps operating, respectively, with more or less variation in their speed, according to circumstances.

To more particularly describe my invention,

I will refer to the accompanying drawings, in which—

Figure 1 represents a complete apparatus involving my invention, with each of its principal parts in central vertical section. Fig. 2 is a horizontal sectional view of the expansion-chamber on line $x$.

The principal parts of the apparatus are the expansion-chamber A, gas or vapor pump B, absorbing and condensing chamber C, and solution-pump D. A chamber to be refrigerated is illustrated at E. The expansion or vaporizing chamber A is a cylindrical structure, having an exit-aperture, $a$, in its top for the gas, and another, at $b$, in the bottom for the solution. Within this chamber are several annular evaporating-pans, $c$, one above the other, and each is provided with a spiral vertical partition of less height than the sides of the pan. The spiral partition $c'$ forms a spiral passage extending from near the center of the pan to its periphery. These pans are each provided with an outlet, $c^2$, for discharging its contents into the next lower pan, and they are located in the pans alternately near the center and near the rim, so that, as seen in the drawings, the contents of the upper pan will descend from near its center into the center of the next pan below, and from said second pan, near its rim, into the third near its rim, and from near the center thereof into the next, and so on throughout the series. The pan-outlets $c^2$ are short open vertical pipes inserted in the bottoms of the pans, their upper ends extending nearly to the tops of the spiral partitions. Should either or all of the pans become wholly filled with solution at any time, so as to overflow their sides, it would be to no disadvantage, as a greater area of exposure would be attained on account of the falling overflow. This arrangement of pans thus constructed obviously affords an extensive area of surface, and the ammoniacal solution passing through the chamber, flowing through the long spiral passage in each pan and falling into the next, affords a condition of turbulence highly conducive to the desired elimination of the volatile matter. In the top or dome of this chamber is a bell-plate, $d$, and beneath it is a horizontal diaphragm or plate, $d'$, having a central aperture. These plates are relied upon to check the upward passage of such heavy watery vapor as may possibly be lifted with the ammonia-gas.

In my apparatus, unlike any others known to me, it is a matter of no material consequence whether the ammonia-gas thus drawn from the expansion-chamber be charged with water or not, and hence I dispense with such drying agents as have heretofore been used in apparatus wherein the gas is liquefied prior to its performance of refrigerating service. The expansion-chamber is preferably well insulated with reference to heat by means of a felted jacket. (Not shown.)

While I have shown a desirable form of expansion-chamber and an effective arrangement of pans, I do not limit myself to any special form, construction, or internal arrangement thereof. I seek to attain the exposure of an extensive area of solution in order to secure the free elimination of the volatile matter, and there are many well-known pre-existing distilling-retorts which will serve a good purpose as substitutes for the expansion-chamber shown, and especially such as spray the fluid within the retort.

The gas or vapor pump B may be of any suitable variety capable of pumping air, and the one shown is of my own invention, and is made the subject of a separate application for Letters Patent. In this connection it is only necessary to state that it is driven in the direction indicated by the arrow, and exhausts gas from the expansion-chamber via pipe $e$ and forces it via pipe $e'$ into the bottom of the absorbing and condensing chamber C, where said pipe terminates in a perforated hollow annulus, $e^2$, as clearly shown. One or more clack-valves, $e^3$, are located in pipe $e'$, between it and the absorption-chamber, to obviate the possibility of a reflux of solution therefrom to the pump B. It is distinctly to be understood that I do not limit myself to a pump of this construction, for a single or double acting piston-pump will effect the desired transfer of gas and induce a desirable vacuum within the expansion-chamber for facilitating the partial elimination of the volatile matter from the solution. The forcing-pressure exerted by said pump, as a rule, will be but little more than is requisite for overcoming the pressure in the pipe $e'$, due to the relative altitudes of the pump and absorption-chamber, and to such pressure as may be from time to time developed within the absorption-chamber. I deem a vapor-pump operating on the rotary principle generally preferable. The pump shown operates in a manner similar to both rotary and piston pumps, in that its piston is driven rotatively and continuously in one direction, but nevertheless it oscillates and is longitudinally reciprocated, the gas being forced from the main chamber of the pump into the auxiliary chamber thereof, via numerous channels in one side of the piston, and said channels are closed at or about the termination of each revolution.

The absorption and condensing chamber C is a cylindrical structure provided with a dome, $f$, on the outside of which is a glass tube-gage for indicating the "water-line" of the solution. From near the base of the dome $f$, and near the top of this chamber, is a pipe, $g$, which extends to and enters the top of the expansion-chamber A, to a point near the outer rim of the upper pan, $c$. Near the dome in pipe $g$ is a valve, $g'$, susceptible of being variably weighted, which is lifted by the high solution in its passage from chamber C to the expansion-chamber. Within this chamber is an extensive stack of continuous coiled lead pipe, $h$, through which water at the lowest possible available temperatures is continuously circulated while the apparatus is in operation.

It must not be understood that the term "absorption-chamber," as used by me, is restricted to a cylindrical structure containing a cooling-coil, as shown. Any of the heretofore-known condensing and absorbing coils used in ice-machines in connection with atmospheric radiation, plentiful sprinkling of water at available temperatures, and exposure to rapid evaporation, would constitute an absorption and condensing chamber in my apparatus without departure from my invention. The important functions of the absorption and condensing chamber render it essential that, however it may be constructed, it should have a capacity to effect the removal from the solution of the heat thereof, incident to its cooling work performed in the refrigerating-chamber, to the pressure and reabsorption of the gas received from the expansion-chamber, and to the friction developed by the pumps, as in ice-machines generally.

I am aware that in some cases I shall require extraordinary facilities for the elimination of heat from the solution, and I have shown in a detached view in Fig. 1 a pair of pipe-connections, $g^2$, in pipe $g$, with an intermediate cock in said pipe, so that the solution on its way to the expansion-chamber may be diverted for circulation through cooling-coils, (not shown), which may be located in the open air and exposed to water-sprinkling and evaporation, in which case said coils would constitute, in substance, enlargements of or additions to the condensing and absorbing chamber.

I am well aware that special apparatus has also heretofore been devised for thoroughly commingling ammonia-gas and water, somewhat after the manner of a steam-injector, and such devices may be embodied in my apparatus without departure from my invention.

The heat developed frictionally by the pumps may wholly, or in part, be disposed of (if such should ever prove to be necessary) by water-jackets applied in a manner well known, through which cooling-fluids should be circulated.

The solution-pump D may be of any of the well-known varieties suited to the purpose of pumping liquids, and preferably sealed with water or glycerine, to prevent the undue escape of volatile matter around its piston. The induction-pipe $i$ is connected, as hereinafter described, with the lower solution-exit, $b$, of the expansion-chamber. Its eduction-pipe $i'$ extends to and downward through the top of the absorption-chamber to its bottom, terminating in an upturned end at $i^2$, so as to discharge the solution against the bell-plate $i^3$ and cause it to be deflected upon the perforated annular pipe $e^2$, through which the gas is forced by the pump, thus insuring an intimate commingling of the low solution with the ammoniacal vapors.

The refrigerating-chamber E will, of course, be varied indefinitely in form and dimensions, according to requirements in each case, and it is wholly immaterial, so far as relates to my invention, whether said chamber be a storehouse, a railway-car, a ship's hold, a hall, or a dwelling, provided the apartment or space to be cooled or refrigerated be provided with suitable pipes, $k$, through which the low cold solution is circulated on its way from the expansion-chamber to the absorption-chamber.

The main feature of my invention, in connection with a refrigerating-chamber, is the employment of the low aqueous solution as a circulating refrigerant within chambers of any kind, including, with those referred to, a cooling-tank for reducing the temperature of liquids of all kinds for use in any and all connections, as in breweries and ice-factories, for instance, or for reducing to a low temperature other non-congealable solutions, for whatever purpose desired. The arrangement of the refrigerating-pipes $k$, and the surface-area thereof, will, of course, be varied according to the particular service desired. I have shown said pipes arranged in flat vertical return-coils located at one end or side of the chamber, but such arrangement and location have been selected merely for convenience in illustration.

The position of the chambers A and C, with relation to each other and to the pumps, may be almost indefinitely varied without departing from my invention; but I have shown the gas-pump above the expansion-chamber, the absorbing and condensing chamber somewhat below and to the one side of the expansion-chamber, the solution-pump near the base of the latter, and all of these above the refrigerating-chamber. I prefer that the solution be taken from the bottom of the expansion-chamber, as shown, but it could be drawn via a pipe projecting downward through the top of said chamber and extending nearly to the bottom thereof, and the chamber could readily be located within the refrigerating-chamber, in which case it need not be jacketed with felt; or said expansion-chamber may be located in a separate apartment, as shown, with the floor perforated to allow the cold air therein to descend into the refrigerating-chamber.

Inasmuch as the expansion-chamber will be the coldest portion of the apparatus, it may well be used for making ice by locating it in a tank containing non-congealable liquid—as, for instance, brine or glycerine, singly or in solution, for the reception of molds containing water to be frozen; but such an arrangement, specially considered, would be substantially as heretofore in ice-machines, and I refer to it in order to disclose the varied capacities of an apparatus otherwise embodying my invention.

In a prior application for Letters Patent filed by me on the 22d of September, A. D. 1880, I employ an equivalent of this expansion-chamber, which contains molds for receiving water to be frozen, and the same arrangement could be made with my present expansion-chamber without in any manner departing from my present invention, which, as before indicated, relates, mainly, to the actual circulation of the aqueous volatile solution as a refrigerant, whereas in my said former apparatus the solution is quiescent, but an alternate transfer of gas from chamber to chamber is, however, therein effected.

For charging the apparatus for service various induction funnels and cocks may be provided, in such numbers and located at such points as shall be deemed most convenient in each apparatus. I have shown a charging-funnel, $l$, through which the solution may be delivered into the expansion-chamber, another at $l'$, through which it may be delivered to the absorption-chamber, and still another at $l^2$, for filling the pipe $k$ which traverses the refrigerating-chamber. I can proceed with charging as follows: Supply an aqueous solution of ammonia—say at half or two-thirds strength—to the pipe $k$ by its funnel $l^2$ until said pipe is filled. Then charge the absorbing-chamber with the same or a trifle higher grade of solution until by the water-gage thereon a proper height is indicated—i. e., somewhat above the connection with pipe $g$. Then work the gas-pump for exhausting the air as far as possible from the expansion-chamber, and permit the escape of the same from the absorption-chamber via the cock and funnel $l'$; or prior to charging the absorption-chamber the air may be thus drawn from the expansion-chamber and forced into the absorption-chamber, from which it will escape during the charging of the latter. The expansion-chamber is then charged by filling its pans as high as their spiral partitions with a solution of full strength, the gas-pump and solution-pump being then started. The air contained within those portions of the apparatus not fully charged with solution, as well as that not otherwise disposed of, must be permitted to escape from the dome of the absorption-chamber until the apparatus is in proper working condition, and to avoid waste of the volatile matter voided with the air the latter may be conducted by a detachable pipe into a close vessel containing water for absorbing the ammonia for future use in the apparatus.

In working the pumps their speed should be varied as circumstances may warrant, from time to time, and therefore each should be provided with cone-pulleys and clutches. In arranging the several pipes and their connections I aim to attain a minimum number of joints, and to avoid all unnecessary cocks or valves, and I recommend the sealing of joints and cocks, wherever practicable, by methods well known, involving the use of glycerine or other suitable matter.

While I prefer ammonia as the volatile agent, I do not limit myself thereto, for approximate results may probably be attained by the use in aqueous solution of various other volatile matters heretofore employed in connection with artificial refrigeration.

Having thus described my invention, I claim—

1. The method of working volatile hydrates, substantially as hereinbefore described, which consists in the continuous circulation through a chamber to be refrigerated of aqueous solutions of volatile matter previously cooled by the expansive elimination therefrom of a portion of said volatile matter.

2. An apparatus for refrigerating by the use of liquid charged with volatile matter embodying in combination, substantially as hereinbefore described, a vaporizing or expansion chamber, an absorbing and condensing chamber, a refrigerating-chamber, a pump for inducing a partial vacuum in the expansion-chamber, and forcing volatile vapor received from said expansion-chamber into the absorbing and condensing chamber, and a pump for circulating liquid cooled by parting with a portion of its volatile matter in the expansion-chamber through the refrigerating-chamber to the absorbing-chamber, and forcing it from thence to the expansion-chamber.

3. In an apparatus for artificial refrigeration, the combination, with an expansion or vaporizing chamber adapted to receive a solution charged with volatile matter and to discharge the same therefrom, of a gas-pump for inducing a partial vacuum in the vaporizing-chamber for facilitating the vaporizing of volatile matter from the solution, and thereby cooling said solution in its passage through said chamber, substantially as described.

4. The combination, with an absorbing and condensing apparatus, a refrigerating-chamber, a gas-pump and liquid-pump, of the expansion-chamber provided with a series of pans, substantially as described, for affording an extensive area of exposure of solution charged with volatile matter.

THOMAS ROSE.

Witnesses:
P. H. WARD,
JAMES DURYEE STEVENSON.